United States Patent [19]

Mizuno et al.

[11] Patent Number: 4,520,500
[45] Date of Patent: May 28, 1985

[54] SPEECH RECOGNITION SYSTEM

[75] Inventors: Kaneyoshi Mizuno; Isamu Nose; Hirosi Iizuka, all of Tokyo, Japan

[73] Assignee: Oki Electric Industry Co., Ltd., Tokyo, Japan

[21] Appl. No.: 373,147

[22] Filed: Apr. 29, 1982

[30] Foreign Application Priority Data

May 7, 1981 [JP] Japan ................................. 56-67614
Jul. 15, 1981 [JP] Japan ................................. 56-109265
Nov. 19, 1981 [JP] Japan ................................. 56-184416

[51] Int. Cl.³ .............................................. G10L 1/00
[52] U.S. Cl. ...................................................... 381/43
[58] Field of Search .................................. 381/41–50; 382/33, 34, 37; 364/513.5

[56] References Cited

U.S. PATENT DOCUMENTS

4,158,750 6/1979 Sakoe et al. ............................ 381/43
4,292,471 9/1981 Kuhn et al. ............................ 381/42
4,400,828 8/1983 Pirz et al. ............................... 381/43

Primary Examiner—E. S. Matt Kemeny
Attorney, Agent, or Firm—Martin Novack

[57] ABSTRACT

This speech recognition system uses a converted-spectrum for comparison of unknown and prestored reference signals. The comparison distance is modified by a weighting factor W to emphasize differences. A straight line approximation of the short term spectrum provides a datum against which the original spectrum is differenced to provide the converted spectrum, and provide deviation signs which are used to modify an initial prestored weighting factor P to form W.

7 Claims, 9 Drawing Figures

SPEECH RECOGNITION SYSTEM

BACKGROUND OF THE INVENTION

The present invention relates to a speech recognition system, in particular, relates to such a system which improves the recognition performance by modifying the distance between an input speech and a reference speech by weighting some elements of reference speech.

Figure 1:
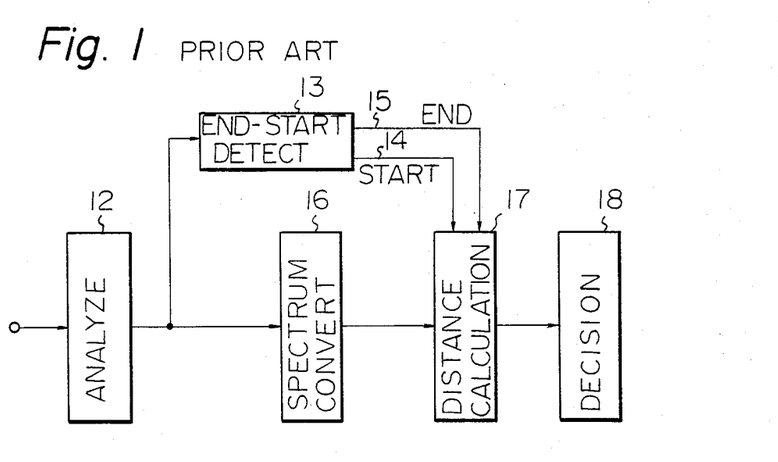
FIG. 1 is a general block diagram of a general speech recognition system.

A prior speech recognition system is shown in FIG. 1, in which the reference numeral 11 is an input terminal for accepting an input speech signal to be recognized, 12 is a frequency analyzer, 13 is a detector for detecting the start point and the end point of the speech to be recognized, 14 is a start signal of a speech, 15 is an end signal of a speech, 16 is a spectrum converter, 17 is a distance calculation means between a reference speech and an input speech, and 18 is a decision circuit.

Figure 2:
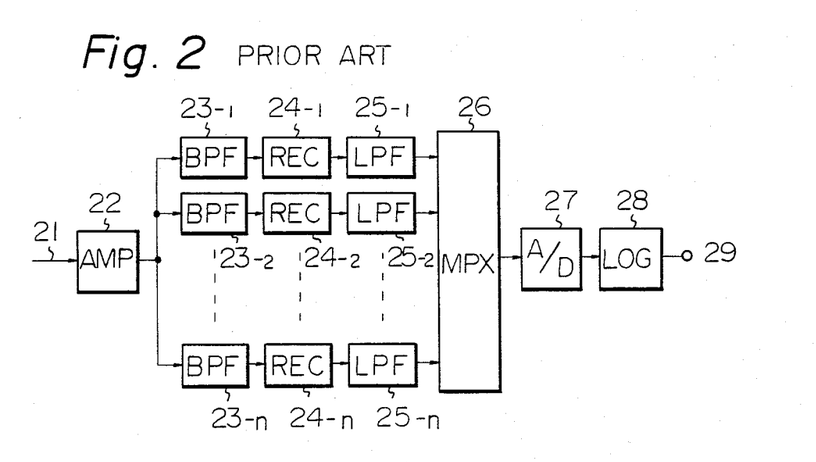
FIG. 2 is a block diagram of a frequency analyzer.

The frequency analyzer 12 is shown in FIG. 2, in which an input speech signal 21 to be recognized is applied to a plurality of bandpass filters 23-1 through 23-n through the pre-amplifier 22. The center frequency of those bandpass filters is, preferably, in the range between 200 Hz and 6000 Hz, and the duration of the adjacent two center frequencies is equal to other durations on a logarithmic scale. The outputs of those bandpass filters 23-1 through 23-n are applied to the multiplexer 26 through the rectifiers 24-1 through 24-n, and the lowpass filters 25-1 through 25-n. The output of the multiplexer 26 is applied to an analog-digital converter 27, which provides the digital outputs for every predetermined interval which is called a sampling period. The output of the converter 27 is applied to the output terminal 29 through the logarithmic converter 28. According to the preferred embodiment, the number of the bandpass filters is 16, and the sampling period is 10 msec.

The output of the frequency analyzer 12 is applied to the start-end detector 13, and the spectrum converter 16.

The start-end detector 13 detects the start point and the end point of the speech to be recognized, and the detected timing of the start point and the end point is applied to the distance calculation means 17 as the start signal 14 and the end signal 15. That detector 13 is implemented by calculating the average level of the outputs of the lowpass filters 25-1 through 25-n for every sampling period, providing the start timing when that average level exceeds the predetermined value, and providing the end timing when that average value becomes lower than that predetermined value.

The spectrum converter 16 normalizes the speech power and the speech source characteristics so that both weak speech and loud speech can be recognized. The spectrum converter is explained in accordance with FIG. 4A and FIG. 4B.

Figure 4A:
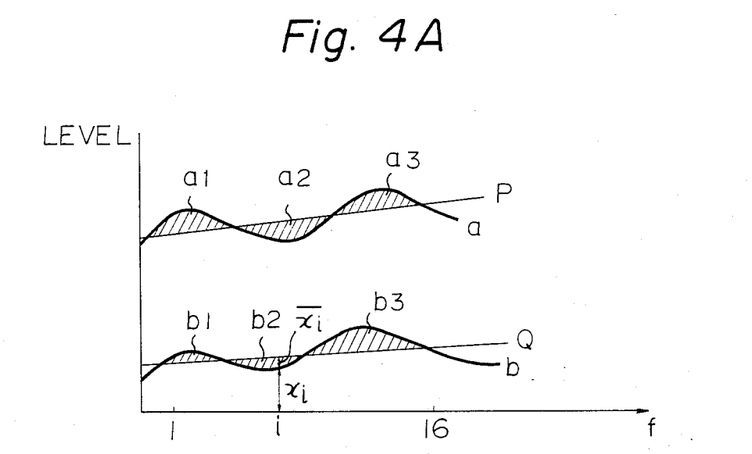
FIG. 4A is the explanatory drawing of the concept of the spectrum conversion.

In FIG. 4A, the horizontal axis shows the frequency, or the channels that are the position of the bandpass filter (and the rectifier and the lowpass filter) in FIG. 2, and the vertical axis shows the power of that channel. The curve (a) shows the case that the speech is loud, and the curve (b) shows the case that the speech is weak. The curves (a) and (b) are approximated by the linear lines (P) and (Q), respectively. Those lines P and Q are obtained through the method of least squares. Then, the difference between the line P (or Q) and the curve a (or b) is obtained, and that difference is the converted spectrum. Therefore, the converted spectrum has the sign, that is to say, the converted spectrum is positive at the region (a1), (a3), (b1) and (b3), and is negative at the region (a2) and (b2). The converted spectrum is independent of the strength of the speech.

The calculation for that conversion is as follows.

Supposing that the output of the frequency analyzer 12 is the i'th channel (i is in the range between 1 and n, and in a preferred embodiment n=16), at some sampling time, is $x_i$, then, the converted data $\bar{x}_i$ is expressed as follows.

$$\bar{x}_i = x_i - (Ai + B) \tag{1}$$

where A and B are determined by the least squares fit line P or Q of FIG. 4A, and are obtained by the equations below.

$$A = \frac{N \cdot \sum_{i=1}^{n} i \cdot x_i - \sum_{i=1}^{n} i \cdot \sum_{i=1}^{n} x_i}{N \sum_{i=1}^{n} i^2 - \left(\sum_{i=1}^{n} i\right)^2} \tag{2}$$

$$B = \frac{\sum_{i=1}^{n} i^2 \cdot \sum_{i=1}^{n} x_i - \sum_{i=1}^{n} i \cdot \sum_{i=1}^{n} i \cdot x_i}{N \sum_{i=1}^{n} i^2 - \left(\sum_{i=1}^{n} i\right)^2} \tag{3}$$

In the equations (2) and (3), since the number N of data is constant, $$\sum_{i=1}^{n} i, \text{ and } \sum_{i=1}^{n} i^2$$

are constant, and therefore, the denominator of the equations (2) and (3) is constant. Therefore, by putting $$C_1 = \sum_{i=1}^{n} i, C_2 = \sum_{i=1}^{n} i^2,$$

the equations (2) and (3) are expressed as follows.

$$A = \frac{N \cdot \sum_{i=1}^{n} i \cdot x_i - C_1 \sum_{i=1}^{n} x_i}{C_3} \tag{4}$$

$$B = \frac{C_2 \cdot \sum_{i=1}^{n} x_i - C_1 \sum_{i=1}^{n} i \cdot x_i}{C_3} \tag{5}$$

where $$C_3 = NC_2 - C_1^2 = N \sum_{i=1}^{n} i^2 - \left(\sum_{i=1}^{n} i\right)^2.$$

As apparent from the equations (4) and (5), the values A and B are obtained by calculating $$\sum_{i=1}^{n} i x_i, \text{ and } \sum_{i=1}^{n} x_i,$$

and further, the converted spectrum $\bar{x}_i$ is obtained by using the equation (1).

Figure 4B:
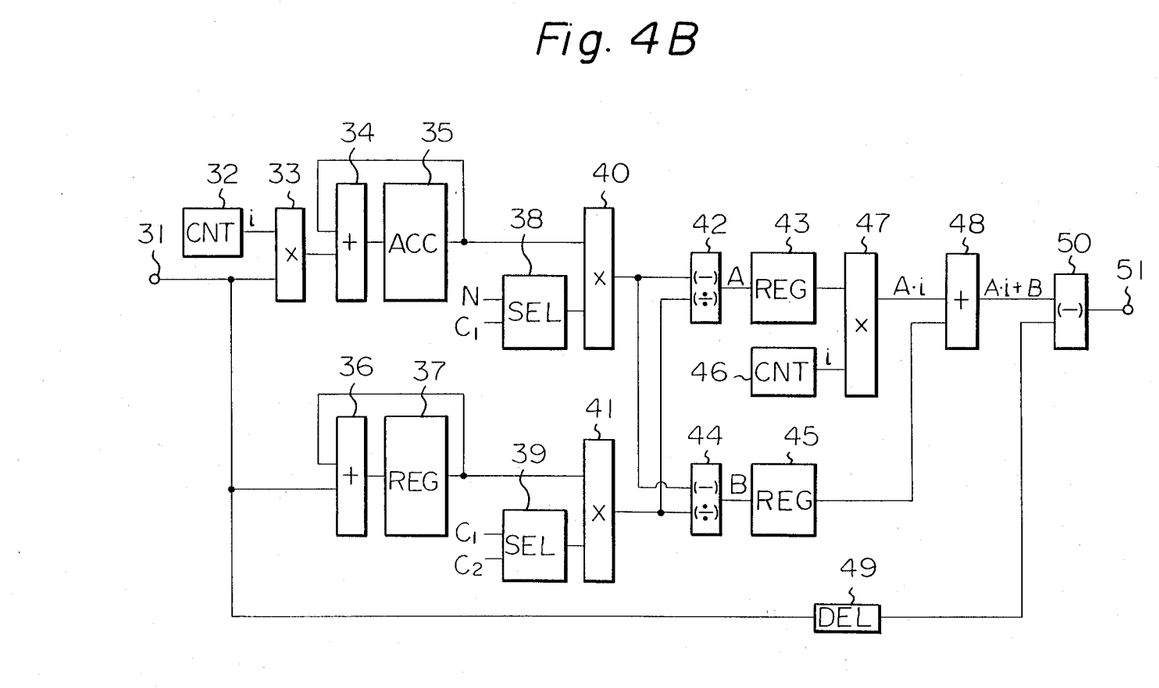
FIG. 4B is a block diagram of a spectrum converter in FIG. 1.

FIG. 4B is a block diagram of a spectrum converter 16 for providing $\bar{x}_i$ from $x_i$.

The input data $x_i$ from the frequency analyzer 12 is applied to the input terminal 31 and is applied to the multiplier 33, which provides the product of $x_i$ and i which is generated by the counter 32. The counter 32 provides that value (i) which is synchronized with the input data. The adder 34 and the register 35 accumulate the output of the multiplicator 33, and then, the register 35 provides the value $$\sum_{i=1}^{n} ix_i.$$

Similarly, the adder 36 and the register 37 accumulate the value $x_i$, and then, the register 37 provides the value $$\sum_{i=1}^{n} x_i.$$

The selector 38 selects one of the constants N and $C_1$, and the selector 39 selects one of the constants $C_1$ and $C_2$. The selected constants are applied to the multipliers 40 and 41, respectively.

When the selectors 38 and 39 select N and $C_1$, respectively, the multiplier 40 provides the product $$N \sum_{i=1}^{n} ix_i,$$

the the multiplier 41 provides the value $$C_1 \sum_{i=1}^{n} x_i.$$

Then, the subtract-divider 42 provides the ratio of the difference between the outputs of the multipliers 40 and 41, and the constant $C_3$, and that ratio is:

$$A = \left( N \sum_{i=1}^{n} ix_i - C_1 \sum_{i=1}^{n} x_i \right) /C_3$$

That ratio is equal to the value A of the equation (4). The value A is stored in the register 43.

Similarly, when the selectors 38 and 39 select $C_1$ and $C_2$, respectively, the subtract-divider 44 provides the ratio of the difference between the outputs of the multipliers 40 and 41, and the constant $C_3$. That ratio is equal to the value B of the equation (5) as follows.

$$B = \left( C_2 \sum_{i=1}^{n} x_i - C_1 \sum_{i=1}^{n} ix_i \right) /C_3$$

The value B is stored in the register 45.

Then, the multiplier 47 provides the product of A and i, which is generated by the counter 46 synchronized with the input data. The adder 48 provides the sum of the outputs of the multiplier 47 and the register 45, and then, the sum is Ai+B.

Finally, the subtractor 50 provides the difference between the output Ai+B of the adder 48, and the input data $x_i$ which is supplied through the delay circuit 49, then the subtractor 50 provides the value:

$$\bar{x}_i = x_i - (Ai + B)$$

The delay circuit 49 compensates the time for the calculation of Ai+B so that the subtractor 50 can receive both values Ai+B and $x_i$ with the synchronized condition.

Thus, the output 51 provides the converted spectrum $\bar{x}_i$ of the equation (1), and that converted spectrum is the difference between the original spectrum $x_i$ and the least squares fit line as described in FIG. 4A.

Figure 3:
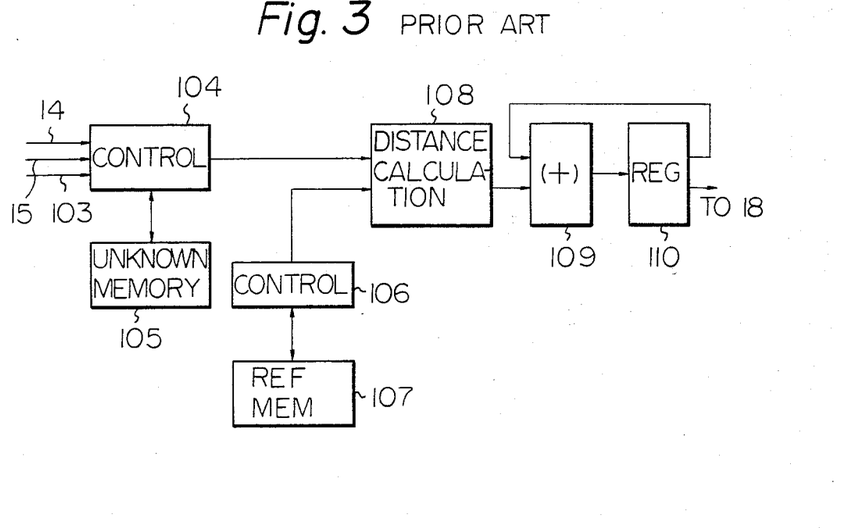
FIG. 3 is a block diagram of a distance calculator in FIG. 1.

The distance calculation means 17 of FIG. 1 is shown in FIG. 3. In FIG. 3, the reference numeral 14 is the speech start signal provided by the detector 13, 15 is the speech end signal provided by the detector 13, 103 is the input data from the spectrum converter 17, 104 is a memory control circuit for controlling the input memory 105, 105 is an input memory for storing the input data from the line 103 between the start and end of the speech, 106 is a reference memory control circuit, 107 is a reference memory which stores the reference speech information. The reference numeral 108 is a distance calculator, 109 is an adder, 110 is a register. The output of the register is applied to the decision circuit 18 of FIG. 1.

The input memory 105 stores the input data which is the converted spectrum of the input speech, between the start of the speech and the end of the speech. The converted spectrum is applied to that input memory 105 through the control circuit 104. The input memory stores the input data of all the channels (see FIG. 4A) for every sampling time. It should be noted that each of those data has a sign (positive or negative), and an absolute value.

When all the input data is stored in the input memory 105, the distance calculator 108 calculates the distance between the input data and each reference data. There are a linear time warping method and a dynamic time warping method for the distance calculation. For simplicity we assumed that the input speech and each reference speech are linearly warped to M (32) frames. FIG. 3 is an example of a known distance calculator.

The distance calculator 108 reads out each element of the input data from the input memory 105 through the control circuit 104, and each element of the reference data from the reference memory 107 through the control circuit 106, then, the distance calculator 108 calculates the absolute value of the difference between the elements of the input data and the selected reference data. The distance calculated by the calculator 108 is accumulated by the adder 109 and the register 110 for all the elements of the selected category. Therefore, the equation for the calculation in 108, 109 and 110 is shown below.

$$\text{DISTANCE} = \sum_{L=1}^{M} \sum_{i=1}^{N} |\bar{x}^R(i,L) - \bar{x}^I(i,L)| \qquad (6)$$

where i shows the channel, L shows the sampling number, M shows the number of linearly warped sampling points, N is the number of channels, R is the reference data, and I is the input data. Of course, it should be noted that the register 110 is cleared when the distance calculation begins.

The result of the distance calculation is applied to the decision circuit 18, which compares the distance of the particular input data with each of the reference categories, and determines that the input speech is the same as the reference category which gives the lowest distance.

However, a prior speech recognition system has the disadvantage that the result of the recognition is sometimes in error, or the recognition is even impossible. That disadvantage comes from the fact that the speech depends upon each speaker, and even the speech of the particular speaker changes for each pronunciation. Therefore, an error occurs when the converted spectrum is similar to another converted spectrum.

SUMMARY OF THE INVENTION

It is an object, therefore, of the present invention to overcome the disadvantages and limitations of a prior speech recognition system by providing a new and improved speech recognition system.

It is an object of the present invention to provide a speech recognition system which provides less recognition error.

According to the present invention the input converted spectrum is compared with the reference spectrum as a whole, so that even when a short period of the spectrum of the input spectrum is rather different from that of the reference spectrum, the input speech is recognized correctly if the input speech is similar to the reference speech as a whole.

The present invention gives some weight to a reference speech for improving the recognition. The weighting is accomplished according to the sign and/or the level of the converted spectrum.

The present speech recognition system comprises (a) an input terminal for accepting an input speech signal to be recognized; (b) a frequency analyzer coupled with said input terminal for providing the spectrum of the input speech signal; (c) a spectrum converter coupled with the output of the spectrum analyzer for converting the spectrum from said frequency analyzer to the difference between said spectrum and the predetermined fit line; (d) a speech detector coupled with the output of said frequency analyzer for detecting the start point and the end point of the input speech; (e) a distance calculation means for calculating the distance or the similarity between the input speech and each of the reference vocabularies; (f) a decision circuit for recognizing an input speech by selecting the minimum distance among the outputs of said distance calculation means; wherein said distance calculation means comprises (g) an input memory for storing the output of said spectrum converter between the start point and the end point of the speech; (h) a reference memory storing the reference data for each vocabularies, some of the elements of each reference data are weighted; (i) a distance calculator for calculating the distance between the output of said input memory and the output of said reference memory; (j) weight adjusting means for adjusting the original weight from the reference memory according to the input data from the input memory and the reference data from the reference memory; (k) a multiplier for providing the product of the output of said distance calculator and the adjusted weight which is the output of said weight adjusting means; and (l) means for accumulating the output of said multiplier.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 5:
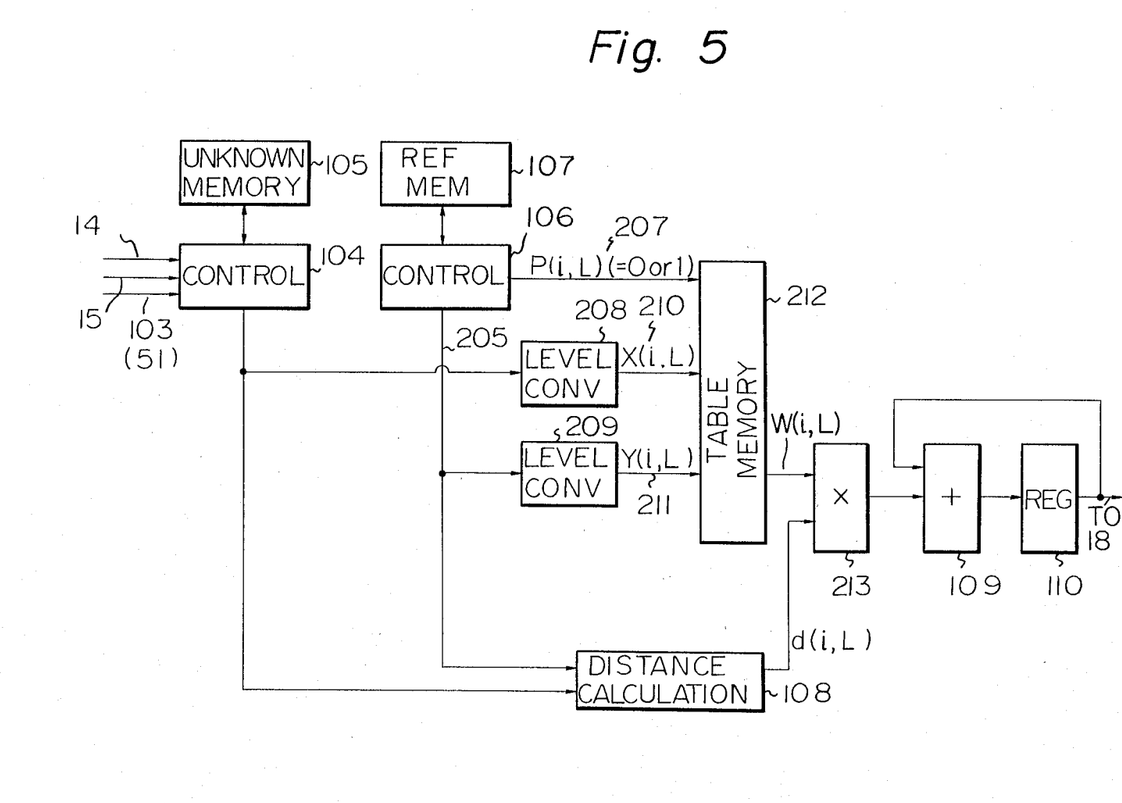
FIG. 5 is a block diagram of the distance calculator according to the present invention.

FIG. 5 shows a block diagram of the distance calculation means according to the present invention. In the figure, the reference numeral 14 is the speech start signal provided by the detector 13 of FIG. 1, 15 is the speech end signal provided by the detector 13, 103 is the input data from the spectrum converter 17 of FIG. 1, 104 is a memory control circuit, 105 is an input memory for storing the input data, 106 is a control circuit, 107 is a reference memory storing the reference speech information for each category, 108 is a distance calculator for providing the absolute value of the difference between the input element and the reference element. The structure and the operation of the distance calculator 108 of FIG. 5 are the same as those of the distance calculator 108 of FIG. 3. The reference numeral 205 is the data output line of the reference memory, 207 is the weight indication P(i,L) line of the reference memory. The weight indication P(i,L) which is 0 or 1 is attached to each reference element. The blocks 208 and 209 are level converters, 208 and 211 are output lines of the level converters 210 and 209, respectively. The reference numeral 212 is a table memory implemented by a ROM (read-only-memory), 213 is a multiplier, 109 is an adder, and 110 is a register.

Comparing the structure of FIG. 5 with FIG. 3, the important feature of FIG. 5 is the presence of the table memory 212 and the multiplier 213.

The distance calculator 108 of FIG. 5 accomplishes the distance calculation which is the same calculation as the distance calculation in FIG. 3, and the equation of the distance calculation by the calculator 108 of FIG. 5 is:

$$d(i,L) = |\bar{x}^R(i,L) - \bar{X}^I(i,L)| \qquad (7)$$

In the embodiment of FIG. 5, the reference memory 107 stores not only the reference pattern element $\bar{x}^R(i,L)$, but also the weight indicator P(i,L) for each element. The weight indicator P(i,L) is 0 or 1, and that value P(i,L) is determined so that the recognition performance becomes high.

The level converters 208 and 209 convert the levels of the outputs of the memories 105 and 107, respectively, so that the number of bits of each element is reduced. The reduction of the number of the bits of each element is beneficial to reduce the capacity of the table memory 212. For the practical embodiment, the number of output bits of the level converters 208 and 209 is 2 through 4. In case of 2 bits, the output of the level converters 208 and 209 for each input level is shown in the following table.

TABLE 1

| Input Level | Output of level converter |
|---|---|
| MIN $\leq \bar{x}(i,L) < \frac{1}{2}$ MIN | 0 |
| $\frac{1}{2}$ MIN $\leq \bar{x}(i,L) < 0$ | 1 |
| $0 \leq \bar{x}(i,L) < \frac{1}{2}$ MAX | 2 |
| $\frac{1}{2}$ MAX $\leq \bar{x}(i,L) < $ MAX | 3 |

Figure 7A:
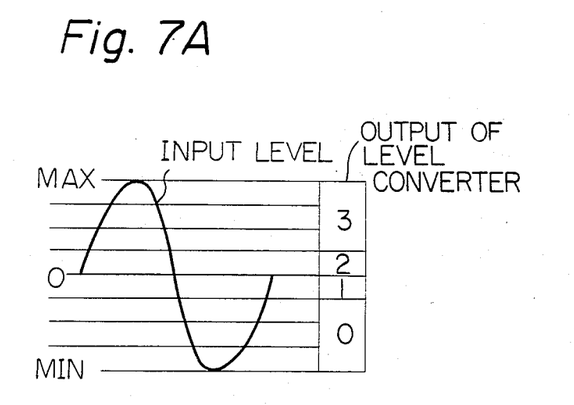
FIG. 7A and FIG. 7B are the explanatory drawings of the weighting system according to the present invention.

In the above table, $\bar{x}(i,L)$ is the input level, MIN is the minimum level of that input level and that minimum level is negative, and MAX is the maximum input level and is positive. The relations of the table 1 are shown in FIG. 7A. The converted level is applied to the table memory 212 through the lines 210 and 211 for designating the address of the table memory 212.

Therefore, the address of the table memory 212 is determined by P(i,L) which is supplied by the reference memory 107, and a pair of converted levels which are supplied by the level converters 208 and 209 according to the levels of the input data and/or the level of the reference data.

The table memory 212 stores the fixed weight for the distance calculation. The weight w(i,L) is 1 when P(i,L)=0, that is to say, when the reference memory does not designate the weight indication, the weight w(i,L) is substantially not designated w(i,L)=1 means that there is no weight).

On the other hand, when P(i,L)=1, the weight w(i,L) is determined by the outputs of the level converters 208 and 209. The example of the weight w(i,L) when the number of output bits of the level converters is 2 is shown in the table 2.

TABLE 2

| P(i,L) | (X(i,L), Y(i,L)) | w(i,b) |
|---|---|---|
| 0 | | 1 |
| 1 | (0,3) or (3,0) | $W_3$ |
| 1 | (0,2),(2,0),(1,3), or (3,1) | $W_2$ |
| 1 | Other combinations | $W_1$ |

In the table 2, X(i,L) is the converted level of the input data, Y(i,L) is the converted level of the reference data. For example, when X(i,L)=0, and Y(i,L)=3, the weight w(i,L) is $W_3$. The weights $W_3$, $W_2$ and $W_1$ satisfy the relationship:

$$W_1 < W_2 < W_3$$

In a preferred embodiment, the value $W_1=1$, $W_2=2$ and $W_3=4$.

It should be noted from the table w(i,L) that weight w is large when the difference between the input data and the reference data is large, and the weight w(i,L) emphasizes the distance when the signs of the input data differ from that of the reference data. That is to say, according to the present invention, the difference between the input data and the reference data is emphasized by weighting.

As a modification of the table 2, it may be possible that the table memory outputs 1 when P(i,L)=0, and outputs fixed value larger than 1 when P(i,L)=1. In that case, the level converters 208 and 209 are removed. And, the structure of the circuit is a little simplified with the trade of a little reduction of the recognition performance.

The multiplier 213 provides the product of the distance d(i,L) which is provided by the distance calculator 108, and the weight w(i,L) which is provided by the table memory 212, and the products is:

$$w(i,L) \times d(i,L)$$

That product is applied to the adder 109, which accumulates that product together with the register 110. Therefore, the register 110 provides the accumulation:

$$\text{DISTANCE} = \sum_{L=1}^{M} \sum_{i=1}^{N} (w(i,L) \times d(i,L)) \qquad (8)$$

That accumulated distance is applied to the decision circuit 18 of FIG. 1, in which the minimum distance is detected among all the reference categories to recognize the input speech.

As described above, the embodiment of FIG. 5 accomplishes the weighting according to the sign and/or the level of the input data and the reference data so that the distance is emphasized when the difference between the input data and the reference data is large. Therefore, when the particular portion of the reference category which is apt to be misunderstood is properly weighted, the difference of the distance of the two categories which are sometimes confused is emphasized, and then, the correct speech recognition is accomplished. Thus, the correct recognition is performed for every speaker and for every pronounciation.

Figure 6:
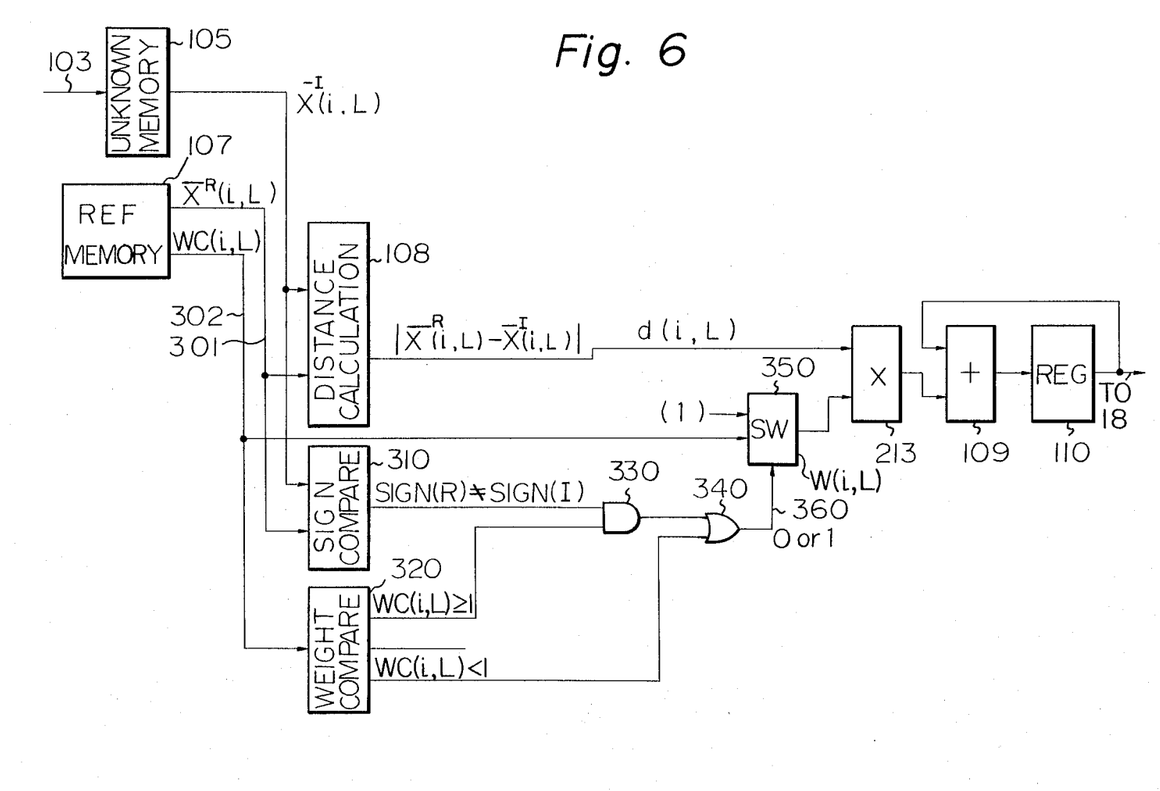
FIG. 6 is a block diagram of another distance calculator according to the present invention.

FIG. 6 is another embodiment of the distance calculation means with the weighting according to the present invention.

In the figure, the reference numeral 103 is an input line of the input data, 105 is an input memory for storing the converted input spectrum, 107 is a reference memory, 108 is a distance calculator. The configuration of the memories 105 and 107, and the distance calculator 108 is the same as that of FIG. 3, and the distance calculator 108 provides the distance between the input element and the reference element according to the equation:

$$d(i,L) = |\bar{x}^R(i,L) - \bar{x}^I(i,L)|$$

The reference numeral 301 is the data output line of the reference memory 107, and that line 301 is applied both to the distance calculator 108 and the sign comparator 310, 302 is the weight output line of the reference memory, and that weight line 302 is applied to the weight comparator 320 and the switch 350. The weight constant WC(i,L) stored in the reference memory 107 may have the value in the range less than 1, equal to 1, and larger than 1. The weight is given to each element of the reference data of each category. The reference numeral 310 is the sign comparator which compares the sign of the reference element from the reference memory 107 with the sign of the input element from the input memory 105, and that sign comparator 310 applies an active signal to the AND circuit 330 when the sign of the reference element is not equal to the sign of the input element which corresponds to the reference element. The reference numeral 320 is a weight comparator, which provides an active output to the AND circuit 330 when the weight constant WC(i,L) w is equal to or larger than 1, and that weight comparator 320 applies an active output signal to an OR circuit 340 when the weight constant WC(i,L) w is less than 1. The reference numeral 350 is a switch, which provides the output value (1) when the control line 360 from the output of the OR circuit 340 is 0, and that switch 350 couples the weight output line 302 from the reference memory 107 with the output of the switch 350 when the control line 360 is 1. Therefore, the resulting weight w(i,L) of the output of the switch 350 is shown in the table 3 below.

TABLE 3

| weight constant wc(i,L) stored in reference memory 107 | Sign | Resulting weight w |
|---|---|---|
| wc(i,L) > 1 | Sign{R(i,L)} = Sign{I(i,L)} | 1 |
| wc(i,L) > 1 | Sign{R(i,L)} ≠ Sign{I(i,L)} | W(i,L) |
| wc(i,L) ≦ 1 | | W(i,L) |

In the above table, Sign{R(i,L)} is the sign (positive or negative) of a reference element, Sign{I(i,L)} is the sign of an input element, WC(i,L) is the weight constant WC(i,L) stored in the reference memory.

Figure 7B:
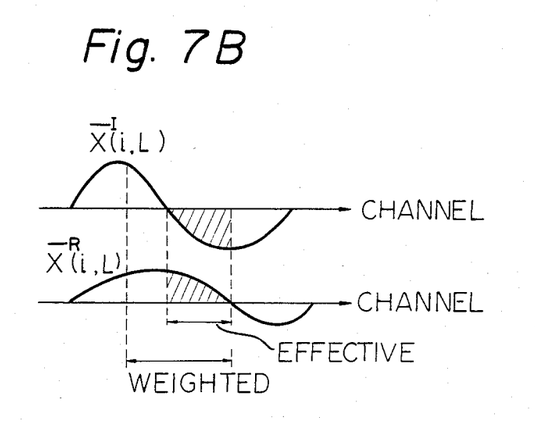

FIG. 7B shows the curves of the converted spectrum $\bar{x}^I(i,L)$ of the input data $\bar{x}^I(i,L)$ and the converted spectrum $\bar{x}^R(i,L)$ of the reference data. The horizontal axis of FIG. 7B is the channel number, and the vertical axis of FIG. 7B shows the weight constant WC(i,L). The weight W(i,L) is given to some of the reference elements which are important for the recognition. Among the weighted elements, only the weights in which the sign of the input elements is different from the sign of the reference elements are effective as shown by the shaded area by FIG. 7B on the condition that the original weight constant WC(i,L) is larger than 1. When the original weight is equal to or less than 1, the element having that weight constant WC(i,L) is not important for the recognition, and therefore, the original weight WC(i,L) is output as it is.

The multiplier 213 provides the product of the difference d(i,L) and the weight w(i,L) and the product is accumulated by the adder 109 and the register 110. The accumulated distance is applied to the decision circuit 18, which determines the input data by selecting the minimum distance.

In the embodiment of FIG. 6, the weight constant WC(i,L) larger than 1 is given to the elements which may be confused with another category so that the distance becomes large, and the weight constant WC less than 1 is given to the elements which are apt to change for every speaker or for every pronounciation so that the effect of the unstable portion which changes for every speaker is reduced.

As described above in detail, the present invention introduces the concept of the weight for an element of a reference data so that the distance between a reference data and an input data is emphasized. Therefore, the improved and correct speech recognition system is obtained.

From the foregoing, it will now be apparent that an improved speech recognition system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A speech recognition system comprising:
   (a) an input terminal (11) for accepting an input speech signal to be recognized,
   (b) a frequency analyzer (12) coupled with said input terminal (11), for providing the spectrum of the input speech signal,
   (c) a spectrum converter (16) coupled with the output of the frequency analyzer (12), for converting the spectrum from said frequency analyzer (12) to the difference between said spectrum and the least square fit line of said spectrum and delivering a spectrum-converted output $\bar{x}^I(i,L)$,
   (d) a speech detector (13) coupled with the output of said frequency analyzer (12) for detecting the start point and the end point of the input speech,
   (e) a distance calculation means (17) for calculating the distance between the converted spectrum of input speech and the converted spectrum of each of a number of reference data, and
   (f) a decision circuit (18) for recognizing an input speech by selecting the minimum distance among the outputs of said distance calculation means (17), CHARACTERIZED IN THAT
said distance calculation means (17) comprises:
   (g) an input memory (105) for storing the output $\bar{x}^I(i,L)$ of said spectrum converter (16), the storing operation being started when the start point is detected by the speech detector (13) and being finished when the end point is detected by the speech detector (13),
   (h) a reference memory (107) for storing the converted spectrum $\bar{x}^R(i,L)$ of the reference data and an original weight provided for particular portions of the reference data,
   (i) a distance calculator (108) for calculating the distance $|\bar{x}^R(i,L)-\bar{x}^I(i,L)|$ between the output $\bar{x}^I(i,L)$ of said input memory (105) and the converted spectrum $\bar{x}^R(i,L)$ of the output of said reference memory (107),
   (j) weight adjusting means (208, 209, 212; or 310, 320, 330, 340, 350) for adjusting the original weight read out from the reference memory (107) according to the output $\bar{x}^I(i,L)$ from the input memory (105) and the converted spectrum $\bar{x}^R(i,L)$ of the reference data from the reference memory (107), and providing the weight w(i,L),
   (k) a multiplier (213) for providing $w(i,L) \times |\bar{x}^R(i,L)-\bar{x}^I(i,L)|$ by multiplying the output $|\bar{x}^R(i,L)-\bar{x}^I(i,L)|$ of said distance calculator (108) and the weight w(i,L) provided by said weight adjusting means (208, 209, 212; or 310, 320, 330, 340, 350), and
   (l) means for accumulating the output of said multiplier (213) to provide the resultant distance to said decision circuit (18).

2. A speech recognition system according to claim 1, wherein the original weight obtained from the reference memory (107) is indicated by a weight indication P(i,L) which indicates an area of the reference memory (107) to be weighted and P(i,L) is 0 or 1, and said weight adjusting means provides the weight w(i,L)=1 when the weight indication P(i,L) from the reference memory is 0, and said weight adjusting means provides the weight w(i,L) equal to or larger than 1 according to the combination of the levels of the input data and the reference data when the weight indication P(i,L) is 1.

3. A speech recognition system according to claim 2, wherein the weight w(i,L) from said weight adjusting means is an integer selected from 1, 2 and 4.

4. A speech recognition system according to claim 3, wherein the weight w(i,L) from said weight adjusting means is larger than 2 when the sign of the input data is opposite from the sign of the reference data.

5. A speech recognition system according to claim 1, wherein the original weight obtained from the reference memory is indicated by weight constant WC(i,L) which is a predetermined weight for each element of the reference data stored in the reference memory (107), the weight constant WC(i,L) being either larger than 1 or smaller than 1, said weight adjusting means provides the weight w(i,L)=1 when the weight constant WC(i,L) is larger than 1 and the sign of the input data is equal to the sign of the reference data, said weight adjusting means providing the same weight as the weight constant WC(i,L) from the reference memory when the weight constant WC(i,L) is larger than 1 and the sign of the input data is opposite from the sign of the reference data, or the weight constant WC(i,L) is equal to or less than 1.

6. A speech recognition system according to claim 2, wherein said weight adjusting means includes a table memory, the addresses of the table memory being designated by the weight indication P(i,L), the level of the input data, and the level of the reference data, said table memory storing the adjusted weights.

7. A speech recognition system according to claim 5, wherein the weight adjusting means includes a sign comparator for comparing the sign of the input data with the sign of the reference data, a weight comparator for determining if the weight constant WC(i,L) is larger or smaller than 1, an AND circuit which provides an active signal when said sign comparator indicates that the sign of the input data is opposite from the sign of the reference data and said weight comparator indicates that the weight constant WC(i,L) is equal to or larger than 1, an OR circuit which provides an active output when said AND circuit provides an active output and said weight comparator indicates that the weight constant WC(i,L) is less than 1, and a switch which outputs the weight 1 when the output of said OR circuit is non-active, and passes the weight constant WC(i,L) to the output of the switch when the output of said OR circuit is active.

* * * * *